Figure 1:
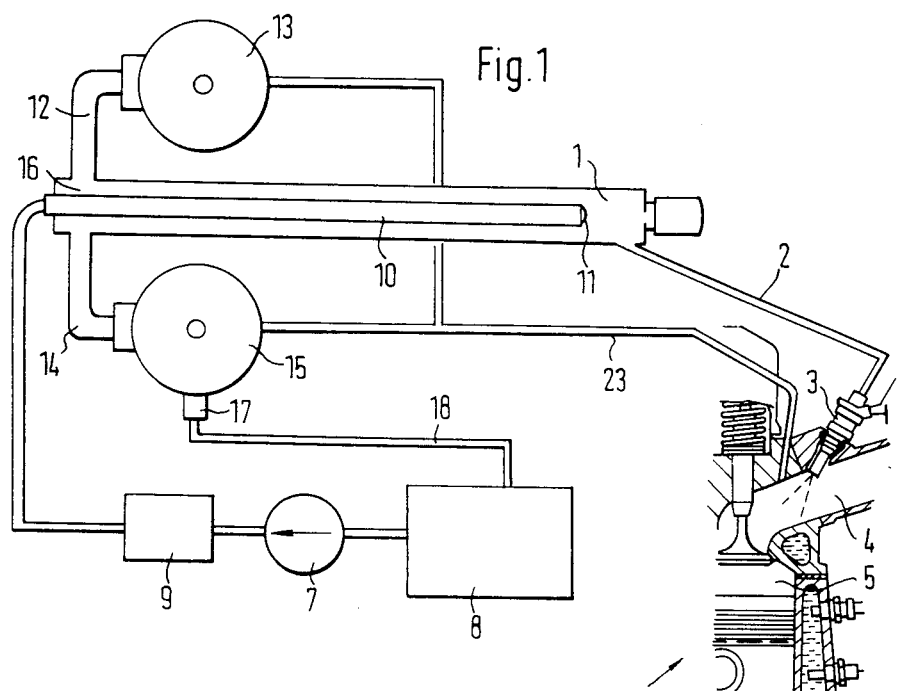

United States Patent [19]

Dörr

[11] Patent Number: 4,562,816
[45] Date of Patent: Jan. 7, 1986

[54] FUEL FEED SYSTEM FOR AN INTERNAL COMBUSTION ENGINE

[75] Inventor: Konrad Dörr, Leonberg, Fed. Rep. of Germany

[73] Assignee: Dr. Ing. h.c.F. Porsche AG, Fed. Rep. of Germany

[21] Appl. No.: 623,928

[22] Filed: Jun. 25, 1984

[30] Foreign Application Priority Data

Jun. 23, 1983 [DE] Fed. Rep. of Germany ....... 3322547

[51] Int. Cl.⁴ .............................................. F02M 37/04
[52] U.S. Cl. ...................................... 123/456; 123/459
[58] Field of Search .......................... 123/456, 457, 459

[56] References Cited

U.S. PATENT DOCUMENTS

| | | | |
|---|---|---|---|
| 3,507,263 | 4/1970 | Long | 123/456 |
| 4,142,497 | 3/1979 | Long | 123/456 |
| 4,205,637 | 6/1980 | Ito et al. | 123/456 |
| 4,300,510 | 11/1981 | Ishida et al. | 123/459 |

*Primary Examiner*—Magdalen Y. C. Moy
*Attorney, Agent, or Firm*—Craig and Burns

[57] ABSTRACT

A fuel feed system of an internal combustion engine, in which for damping fuel oscillations which are excited by the closing of injection valves and which occur amplified in a predetermined rotational speed range, a damper is attached to the distributor pipe opposite to a regulator. The damper is of the same type of construction and size as the regulator and forms together with the same a resonator-antiresonator system, whereby the fuel column oscillates to and fro with low flow losses between the regulator and damper.

7 Claims, 2 Drawing Figures

FUEL FEED SYSTEM FOR AN INTERNAL COMBUSTION ENGINE

The present invention relates to a fuel-feed system of an internal combustion engine by means of which fuel supplied by a pump is distributed to the injection valves coordinated to the individual combustion chambers, whereby a regulator for the fuel pressure and a damper for fuel oscillations are arranged at the fuel line.

Such fuel feed systems are used in known fuel injection installations (Bosh, Technische Unterrichtung, Benzineinspritzung, D- and L-Jetronic, 1975) in order to distribute the fuel uniformly to the injection valves installed in the individual suction pipes of the cylinders. The fuel pressure is kept constant by means of a pressure regulator attached to a distributor pipe. The pressure regulator consists of a metallic housing, in which a spring-loaded diaphragm opens up the opening to a return line when exceeding the adjusted pressure, through which the fuel is conducted back to the fuel tank. In order to dampen noise resulting in the fuel feed line, dampers are installed which are of the same type of construction as the regulators. However, it is not possible in this manner to eliminate fuel oscillations which within a certain rotational speed range of the internal combustion engine occur amplified as a result of resonance phenomena and lead to a mixture-leaning of the order of magnitude of 10%. By reason of this mixture leaning, a motor vehicle, into which the internal combustion engine is installed, undergoes periodic longitudinal accelerations, i.e., it "jerks." This problem is further amplified by the fact that the period of the fuel oscillation is of the same order of magnitude as the injection duration in the lower partial load range so that with a rotational speed of 2,200 rpm to 2,800 rpm, a very annoying jerking occurs.

It is the object of the present invention to eliminate these fuel oscillations by a meaningful arrangement of the regulator and of the damper at the fuel line.

The underlying problems are solved according to the present invention in that the regulator and the damper are so attached to a distributor pipe that they form a resonator-antiresonator system oscillating in opposite phase, in which the fuel oscillates to and fro with low flow resistance. In order to permit the damper and regulator to act as directly coupled resonators of the same frequency, it is appropriate to make the flow resistance of the fuel column oscillating between the same as small as possible. According to another feature of the present invention, the connecting pipes of the regulator and damper are thereby connected transversely at the distributor pipe on mutually opposite sides thereof and mutually aligned. The fuel thus oscillates perpendicularly to the distributor pipe between the regulator and the damper nearly free of forces. Consequently, no high alternate pressures can build up which might cause a mixture-leaning at the instant of the injection. The pressure level remains small and the pressure amplitudes are nearly completely eliminated by turbulence or vortex losses at the instant of the injection.

Figure 2:
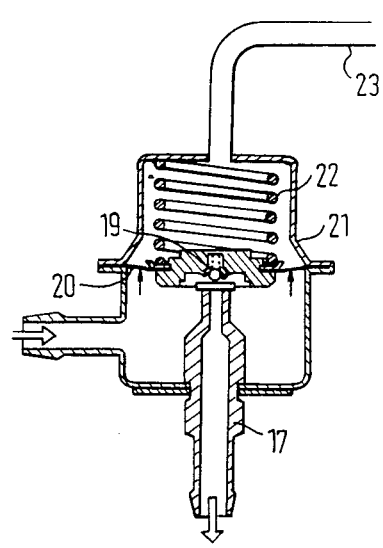

These and other objects, features and advantages of the present invention will become more apparent from the following description when taken in connection with the accompanying drawing which shows, for purposes of illustration only, one embodiment in accordance with the present invention, and wherein:

FIG. 1 is a schematic view of a fuel-feed system with regulator and damper in accordance with the present invention; and FIG. 2 is a cross-sectional view through the regulator in accordance with the present invention.

Referring now to the drawing wherein like reference numerals are used throughout the two views to designate like parts, fuel lines 2 lead from a distributor pipe 1 to electromagnetic injection valves 3 which are installed into the invididual suction pipes 4 of the cylinders 5 of a reciprocating piston internal combustion engine 6. The fuel is supplied by means of a pump 7 from a fuel tank 8 by way of a filter 9 into a feed pipe 10 which is inserted concentrically into the distributor pipe 1 and extends so far that its discharge place 11 is located at the opposite end of the distributor pipe 1. A damper 13 is attached laterally at the distributor pipe 1 by means of a perpendicular connecting pipe 12 and opposite thereto, a regulator 15 is attached by means of a connecting pipe 14. The connecting pipes 12 and 14 are disposed mutually aligned, and their connecting place 16 lies within the area where the feed pipe 10 is inserted in a sealed manner into the distributor pipe 1.

The pressure of the fuel is kept constant by means of the regulator 15 illustrated in FIG. 2. This is necessary such that an exact fuel metering is possible over the entire opening duration of the injection valves 3. If the pressure adjusted at the regulator 15 is exceeded, then fuel flows back into the tank 8 by way of a connecting nipple 17 and a return line 18. For that purpose, a ball valve 19 is provided at the inlet of the connecting nipple 17 which is secured at a diaphragm 20. The diaphragm 20 is circumferentially clamped within the housing 21 and is supported and prestressed relative to the housing bottom by way of a spring 22. The pressure acting on the diaphragm 20 by way of the line 23 connected to the suction pipe 4 of the cylinder 5 determines together with the spring force the fuel pressure in the distributor pipe 1.

An apparatus of identical type of construction and size is used as damper 13 as is used for the regulator 15, whereby only the connecting nipple 17 and corresponding housing openings are missing. The springs and the masses of the regulator 15 and of the damper 13 form together with the fuel an oscillating system whose frequency lies at about 200 Hz independently of the rotational speed of the internal combustion engine. The amplitudes of the fuel oscillations which are caused by the closing of the injection valves and occur amplified by resonance phenomena in the rotational speed range of 2,200 to 2,800 rpm, are reduced by means of the damper 13 oscillating in the opposite phase to the regulator 15 to such an extent that they have nearly diminished to zero until the next instant of injection so that the fuel is supplied to the injection valves 3 at all times with the requisite constant pressure.

In a preferred embodiment of this invention, the distance of the discharge place 11 of the feed pipe 10 to the connecting place 16 amounts to about five times the internal width of the distributor pipe 11 and the connecting pipes 12 and 14 are of the same length, each including a straight pipe section adjoined by an arcuate pipe section pointing in the direction toward the distributor pipe 1.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are emcompassed by the scope of the appended claims.

I claim:

1. A fuel feed system for an internal combustion engine in which fuel supplied by a pump is distributed to injection valves coordinated to individual combustion chambers, comprising a fuel line means connecting the pump and injection valves, a regulator means for regulating fuel pressure, and a damper means for damping fuel oscillations, the regulator means and damper means using substantially identical structural parts including a spring-loaded diaphragm disposed within a housing and a valve, said regulator means and damper means having approximately the same natural frequency, said fuel line means including a distributor pipe, said regulator means and damper means being so attached to said distributor pipe that they form a resonator-antiresonator system oscillating in opposite phase, within which fuel can oscillate to and fro with relatively low flow resistance, said resonator-antiresonator system thereby generally precluding a buildup of alternate pressures which might cause mixture-leaning during fuel distribution by the injection valves, wherein the damper means and regulator means are connected to opposite sides of the distributor pipe by way of connecting pipes substantially aligned with one another and extending substantially transversely thereto.

2. A fuel feed system according to claim 1, wherein said fuel line means include a fuel feed pipe inserted substantially concentrically into the distributor pipe near the connecting place of the regulator means and of the damper means.

3. A fuel feed system according to claim 2, wherein the distance of the discharge place of the fuel feed pipe to the connecting place of the regulator means and damper means amounts to about five times the internal diameter of the distributor pipe.

4. A fuel feed system according to claim 3, wherein the connecting pipes connecting the distributor pipe with the regulator means and damper means are substantially of the same length and include straight line sections as well as adjoining arcuate pipe sections pointing toward the distributor pipe.

5. A fuel feed system for an internal combustion engine in which fuel supplied by a pump is distributed to injection valves coordinated to individual combustion chambers, comprising a fuel line means connecting the pump and injection valves, a regulator means for regulating fuel pressure, and a damper means for damping fuel oscillations, the regulator means and damper means using substantially identical structural parts including a spring-loaded diaphragm disposed within a housing and a valve, said regulator means and damper means having approximately the same natural frequency, said fuel line means including a distributor pipe, said regulator means and damper means being so attached to said distributor pipe that they form a resonator-antiresonator system oscillating in opposite phase, within which fuel can oscillate to and fro with relatively low flow resistance, said resonator-antiresonator system thereby generally precluding a buildup of alternate pressures which might cause mixture-leaning during fuel distribution by the injection valves, wherein said fuel line means includes a fuel feed pipe inserted substantially concentrically into the distributor pipe near the connecting place of the regulator means and of the damper means.

6. A fuel feed system according to claim 5, wherein the distance of the discharge place of the fuel feed pipe to the connecting place of the regulator means and damper means amounts to about five times the internal diameter of the distributor pipe.

7. A fuel feed system according to claim 1, wherein the connecting pipes connecting the distributor pipe with the regulator means and damper means are substantially of the same length and include straight line sections as well as adjoining arcuate pipe sections pointing toward the distributor pipe.

* * * * *